United States Patent [19]

Waltman

[11] Patent Number: 4,688,477
[45] Date of Patent: Aug. 25, 1987

[54] CLAMPING MEMBER FOR A ROTISSERIE

[76] Inventor: John H. Waltman, 3336 Bald Mountain Rd., Pontiac, Mich. 48057

[21] Appl. No.: 930,108

[22] Filed: Nov. 13, 1986

[51] Int. Cl.[4] ............................................. A47J 43/18
[52] U.S. Cl. ........................................ 99/427; 99/449
[58] Field of Search ................ 99/421 H, 421 R, 426, 99/427, 449, 393, 450

[56] References Cited

U.S. PATENT DOCUMENTS

| | | |
|---|---|---|
| 779,128 | 1/1905 | Mummey et al. |
| 1,899,335 | 2/1933 | Kastner ................... 99/427 |
| 1,993,607 | 3/1935 | Kalgren ................... 219/35 |
| 2,297,825 | 10/1942 | Bobo ........................... 53/5 |
| 2,638,841 | 5/1953 | Boyce ....................... 99/427 |
| 2,749,497 | 5/1956 | Brown ....................... 99/427 |
| 2,839,989 | 6/1958 | Persinger ................. 99/427 |
| 2,938,450 | 5/1960 | Carpenter et al. ...... 99/427 |
| 3,103,161 | 9/1963 | Whitehead ............... 99/427 |
| 3,344,736 | 10/1967 | Myler et al. ............. 99/421 |
| 3,563,159 | 2/1971 | Johnson .................. 99/339 |
| 3,797,379 | 3/1974 | Brion ....................... 99/421 |
| 4,442,762 | 4/1984 | Beller ...................... 99/427 |
| 4,505,195 | 3/1985 | Waltman ................. 99/427 |
| 4,593,613 | 1/1986 | Waltman ............. 99/421 R |
| 4,625,634 | 12/1986 | Kruper .................... 99/427 |

FOREIGN PATENT DOCUMENTS 1947386  3/1971  Fed. Rep. of Germany.

*Primary Examiner*—Henry S. Jaudon
*Attorney, Agent, or Firm*—Basile, Weintraub & Hanlon

[57] ABSTRACT

An improvement of at least one clamping member for use in a rotisserie with a cradle having a pair of longitudinally spaced opposite end plates, and a plurality of longitudinally extending and circumferentially spaced rods fixedly secured to said end plates. A pair of adjacent rods are circumferentially spaced from each other a sufficient distance to define a longitudinal opening for the passage of food into the interior of the cradle. The clamping member has a leg with a longitudinal axis, a first end, and a second end. A food clamp having an L-shaped member is attached to the first end of the leg, and a U-shaped member is fixedly secured adjacent to the corner of the L-shaped member. The second end of the leg is pivotally secured to an adjacent rod, allowing pivotal rotation about and longitudinal movement along the adjacent rod. The second end of the leg is anchorable in a desired angular and longitudinal position on said adjacent rod.

17 Claims, 4 Drawing Figures

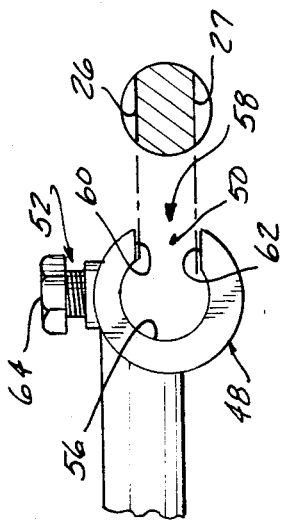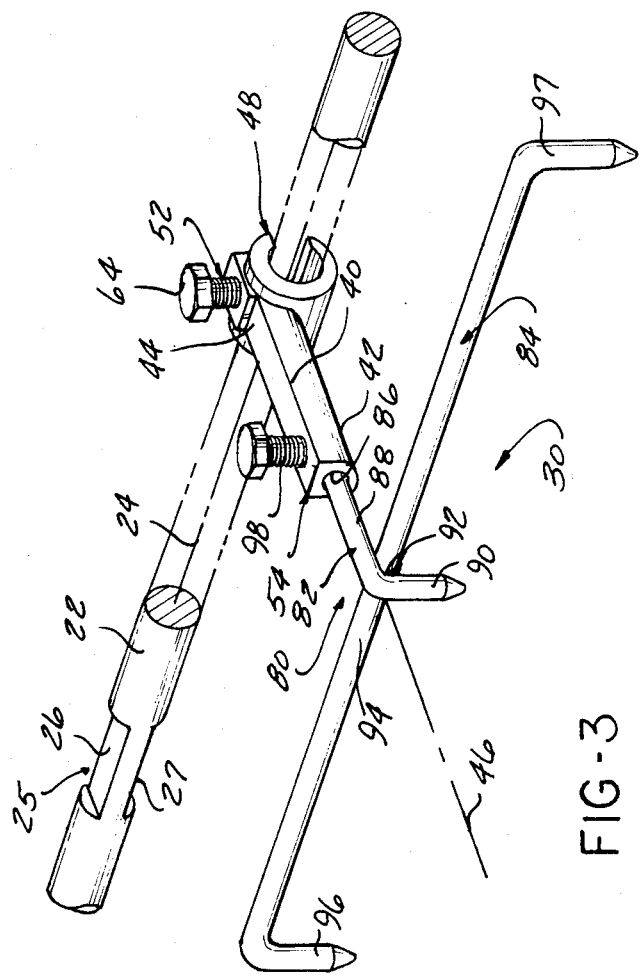

CLAMPING MEMBER FOR A ROTISSERIE

BACKGROUND OF THE INVENTION

I. Field of the Invention

The present invention relates to rotisseries and, in particular, to a barbecue apparatus in which food is adapted to be mounted and rotated over a source of heat.

II. Description of the Prior Art

In the prior art, food, such as meat to be grilled, is generally placed on a spit which is rotatable to expose the meat to the heat in order to ensure uniform cooking of the same. In cooking large meats, such as a pig roast or a large side of beef, the spit may not be capable of rotatably supporting the meat to be grilled because of its shape. In many situations the spit is provided with forks that are carried by the spit and which pierce the opposite ends of the meat; however, after a considerable amount of rotation of the spit, the forks sometimes break loose of the meat and the meat fails to rotate, thus causing uneven heating and cooking of the same. In many applications the rotisseries include cradles, sometimes referred to as cages, in an attempt to facilitate the necessary support required for long periods of rotation of the meat. In many situations it is difficult to adequately secure, or anchor, the meat within the cradle, resulting in undesirable jostling of the meat during rotation of the rotisserie. It would be desirable to provide a means for securing the meat within the cradle of the rotisserie so as to prevent movement of meat which can result in portions of meat breaking loose from the whole carcass as it moves within the cradle.

Many of the prior art devices suggest a variety of means for overcoming certain of the aforementioned problems. For example, U.S. Pat. Nos. 3,563,159 and 2,938,450 each disclose a rotatable cage member having a circular cross section which includes a concentric spit for mounting an animal or piece of meat thereon. The cage is rotatable about an underlying support stand.

U.S. Pat. No. 2,839,989 discloses a barbecue attachment having a rectangular cross section which includes a spit running therethrough for receiving objects thereon for barbecuing.

U.S. Pat. Nos. 1,993,607 and 3,103,161 are considered relevant to the present invention as disclosing rotatable barbecue apparatuses including cages having a circular or rectangular configuration, respectively. Other prior art patents of which Applicant is aware include U.S. Pat. Nos. 2,297,825, 3,344,736 and 3,797,379. These patents show other types of barbecuing apparatuses which include means for supporting meat to be cooked for barbecuing in which the apparatuses are rotatable about an underlying fire.

Other relevant art includes German Pat. No. 1,947,386 and U.S. Pat. No. 779,128. U.S. Pat. Nos. 4,593,613 and 4,505,195 are also considered relevant to the present invention as disclosing rotatable barbecue apparatuses including cages or cradles.

None of the prior art patents disclose means for securing the meat to the cradle which readily adjust to a variety of longitudinal and angular positions to conform to the exterior of the meat surface to provide the most effective means for securing the meat.

SUMMARY OF THE INVENTION

The present invention relates to an improved clamping member for mounting on a rotisserie that includes a cradle that is rotated at the proper speed above a heat source. The cradle has a pair of longitudinally spaced opposite end plates and a plurality of longitudinally extending and circumferentially spaced rods fixedly secured to the end plates. A pair of adjacent rods are circumferentially spaced from each other a sufficient distance to define a longitudinal opening for the passage of food into the interior of the cradle. A plurality of clamping members are pivotally secured to the adjacent rods such that the clamping members are individually pivotable about and movable along the longitudinal axis of the adjacent rod to open and close the longitudinal opening. In addition, the clamping members are anchorable in a desired longitudinal location along the longitudinal axis of the adjacent rod. Each clamping member has a leg and a food clamp. The food clamp has an L-shaped member attached to the first end of the leg and a U-shaped member fixedly secured to the L-shaped member.

It is an object of the present invention to provide an improved clamping member for the cradle of a rotisserie which is readily adjustable longitudinally and angularly to conform to the outer contour of the meat placed within the cradle of the rotisserie.

Other objects, advantages and applications of the present invention will become apparent to those skilled in the art of rotisseries when the following description of the best modes comtemplated for practicing the invention are read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 3 is a perspective view of the improved clamping member; and

FIG. 4 is a detail of the removable mounting means of the improved clamping member.

DESCRIPTION OF THE PREFERRED EMBODIMENT

Figure 1:
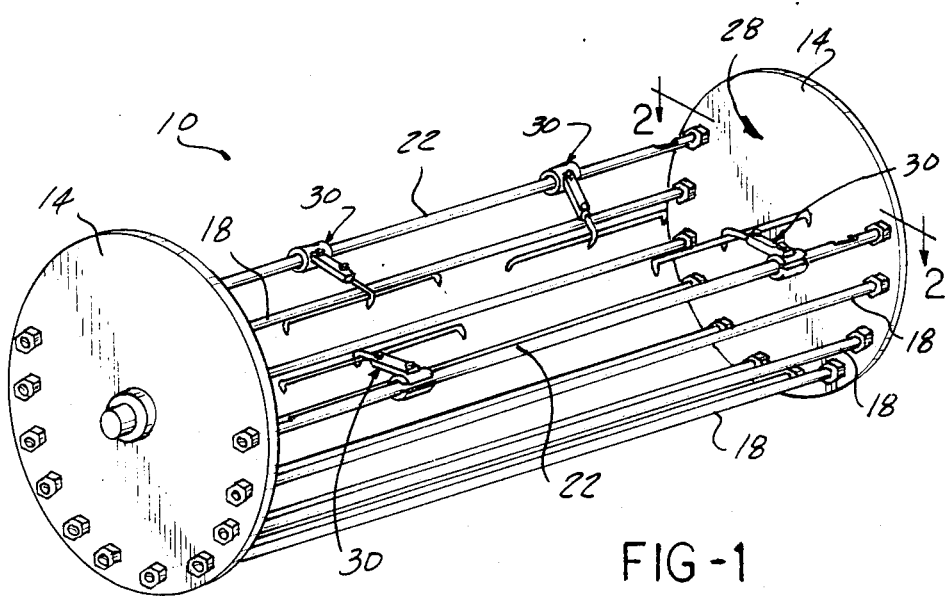
FIG. 1 is a perspective view of the cradle of a rotisserie.
Figure 2:
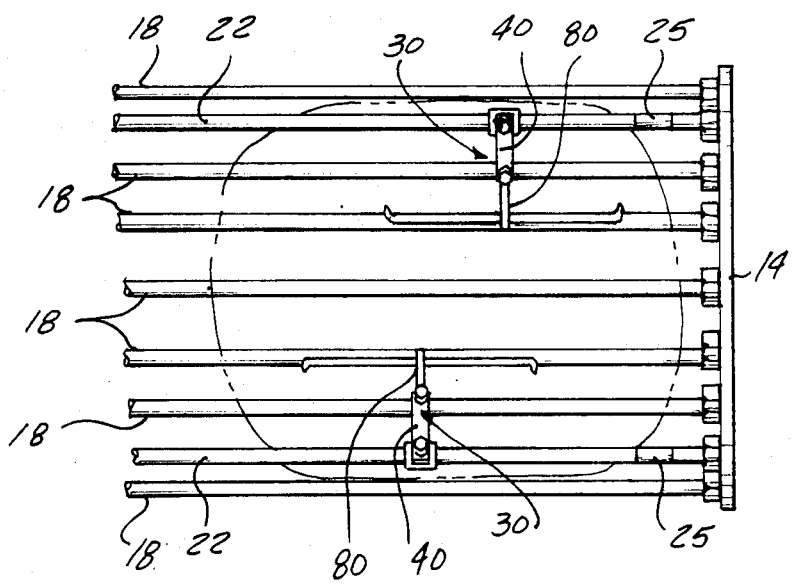
FIG. 2 is a partial cross-sectional view of the cradle from FIG. 1.

Referring now to FIGS. 1 and 2, the present invention relates to an improved clamping member, referred to generally as 30, for use in a rotisserie with a cradle 10 having a pair of longitudinally extending and circumferentially spaced rods 18 are fixedly secured to the end plates 14. A pair of adjacent rods 22 are circumferentially spaced from each other a sufficient distance to define a longitudinal opening 28 for the passage of food into the interior of the cradle 10. Each of the adjacent rods 22 has a longitudinal axis 24 (see FIG. 3). A plurality of clamping members 30 are mounted on the adjacent rods such that each clamping member 30 is pivotable about and movable along the longitudinal axis 24 of the adjacent rods 22 to open and close the longitudinal opening 28.

Referring now to FIG. 3, each clamping member 30 is composed of two parts—a leg 40 and food clamp 80. In a preferred embodiment the food clamp 80 is removable from the leg 40. In addition, means 54 for releasably attaching the food clamp 80 to the leg 40 allows the food clamp 80 to be rotatable about and extensible along a longitudinal axis 46 of the leg 40.

The leg 40 has a longitudinal axis 46, a first end 42, and a second end 44. Means 48 for pivotally securing the second end 44 of the leg 40 to the adjacent rod 22 allows the clamping member 30 to be pivotable about and movable along the longitudinal axis 24 of the adjacent rod 22 to open and close the longitudinal opening 28. The securing means 48, in a preferred embodiment, comprises a perpendicular bore 56, in relation to the longitudinal axis 46 of the leg 40, matingly engageable with and pivotal around the adjacent rod 22. Securing means 48 allows longitudinal movement along adjacent rod 22 and pivotal rotation about the longitudinal axis of rod 22.

Means 50 for (removable mounting) the second end 44 of the leg 40 to the adjacent rod 22 are provided in another preferred embodiment. The removable mounting means 50 can comprise a slot 58 passing through the second end 44 of the leg 40 having a pair of opposing parallel faces, 60 and 62 respectively, in communication with the perpendicular bore 56 such that the leg 40 is removable from the adjacent rod 22 by moving the leg 40 to a notched portion 25 of the adjacent rod 22. The notched portion 25 has a pair of parallel, longitudinal, notched faces, 26 and 27 respectively, smaller than the slot 58 in the leg 40 allowing the adjacent rod 22 to pass through slot 58 of the leg 40.

Means 52 for anchoring the second end 44 of the leg 40 in a desired angular and longitudinal position on the adjacent rod 22 are provided in another preferred embodiment. The anchoring means 52 can comprise a bolt 64 threadingly engaged, through the second end 44 of the leg 40, in communication with the perpendicular bore 56, such that tightening the bolt 64 causes the adjacent rod 22 to be fixedly anchored between the bolt 64 and the perpendicular bore 56 holding the leg in a desired angular and longitudinal position.

In a preferred embodiment, the food clamp 80 has an L-shaped member 82 with a first end 88 matingly engageable within a longitudinal bore 86 in the first end 42 of the leg 40, and a U-shaped member 84 fixedly disposed adjacent to a corner 92 of the L-shaped member 82. Two ends, 96 and 97 respectively, of the U-shaped member 84 are oriented parallel to a second end 90 of the L-shaped member 82. Means 54 for releasably attaching the food clamp 80 to the leg 40 allows rotation about and extension along the longitudinal axis 46 of the leg 40, in another preferred embodiment. The releasable attaching means 54 can comprise a longitudinal bore 86 in the second end 42 of the leg 40 which is matingly engageable with the first end 88 of the L-shaped member 82 of the food clamp 80, and a second bolt 98 threadingly engaged through the first end 42 of the leg 40 in communication with the longitudinal bore 86, such that tightening the bolt 98 causes the food clamp 80 to be fixedly attached between the bolt 98 and the longitudinal bore 86. The releasable attaching means 54 allows the food clamp 80 to be rotated about and extended along the longitudinal axis 46 of the leg 40, thereby allowing the food clamp 80 to be adjusted in a desired orientation prior to fixedly securing the food clamp 80 with the bolt 98. The desired orientation of the food clamp corresponds to the particular outer contour of the meat to be secured within the cradle 10 of the rotisserie.

In another preferred embodiment, considered the best mode of practicing the present invention, combining the anchoring means 52 of the leg 40 with the releasable attaching means 54 of the food clamp 80 provides four degrees of freedom of movement, namely: longitudinal movement along the adjacent rod 22, pivotal movement around the longitudinal axis 24 of the adjacent rod 22, extension of the food clamp 80 along the longitudinal axis 46 of the leg 40, and rotational movement about the longitudinal axis 46 of the leg 40.

I claim:

1. In a rotisserie with a cradle having a pair of longitudinally spaced opposite end plates, a plurality of longitudinally extending and circumferentially spaced rods fixedly secured to said end plates, a pair of adjacent rods being circumferentially spaced from each other a sufficient distance to define a longitudinal opening for the passage of food into the interior of said cradle, the improvement of at least one clamping member comprising:

a leg having a longitudinal axis, a first end and a second end;

a food clamp having an L-shaped member attached to the first end of the leg and a U-shaped member fixedly secured to the L-shaped member;

means for pivotally securing the second end of the leg to said adjacent rod, allowing pivotal rotation about and longitudinal movement along said adjacent rod; and means for anchoring the second end of the leg in a desired pivoted position and in a desired longitudinal location on said adjacent rod.

2. The improvement of claim 1, wherein the longitudinal axis of the leg is perpendicular to said adjacent rod.

3. The improvement of claim 1, wherein the securing means comprises a perpendicular bore, in relation to the longitudinal axis of the leg, passing through the second end of the leg, matingly engageable with said adjacent rod allowing longitudinal movement along and pivotal rotation around said adjacent rod.

4. The improvement of claim 3, wherein the anchoring means comprises a bolt threadingly engaged within the second end of the leg in communication with the perpendicular bore such that tightening the bolt causes said adjacent rod to be fixedly anchored between the bolt and the perpendicular bore surface opposing the bolt holding the leg in a desired angular and longitudinal position.

5. The improvement of claim 3, further comprising means for removably mounting the second end of the leg to said adjacent rod.

6. The improvement of claim 5, wherein the removable mounting means comprises:

said adjacent rod having a notched portion with parallel, longitudinal notched faces cut into said adjacent rod;

the second end of the leg having a slot passing through the leg with a pair of opposing parallel faces in communication with the perpendicular bore allowing removal of the clamping member from said adjacent rod by moving the leg to the notched portion of said adjacent rod and passing the notched portion of said adjacent rod through the slot in the second end of the leg.

7. The improvement of claim 1, further comprising means for releasably attaching the food clamp to the first end of the leg allowing pivotal rotation about and extension along the longitudinal axis of the leg.

8. The improvement of claim 7, wherein the releasable attaching means comprises:

the first end of the leg having a longitudinal bore;

a bolt threadingly engaged within the first end of the leg in communication with the longitudinal bore such that tightening the bolt causes the food clamp to be fixedly attached between the bolt and the longitudinal bore surface opposing the bolt in a desired orientation of rotation and extension.

9. The improvement of claim 1, further comprising means for removably mounting the second end of the leg to said adjacent rod.

10. The improvement of claim 1, wherein the food clamp further comprises a U-shaped member having a middle section and two ends, each end formed paralled to one another and perpendicular to the middle section, the middle section fixedly secured at an angle formed between a first end of the L-shaped member and a second end of the L-shaped member, and the two ends of the U-shaped member oriented parallel to the second end of the L-shaped member.

11. In a rotisserie with a cradle having a pair of longitudinally spaced opposite end plates, a plurality of longitudinally extending and circumferentially spaced rods fixedly secured to said end plates, a pair of adjacent rods being circumferentially spaced from each other a sufficient distance to define a longitudinal opening for the passage of food into the interior of said cradle, the improvement of at least one clamping member comprising:

a leg having a longitudinal axis, a first end, a second end and a longitudinal bore in the first end;

means for pivotally securing the second end of the leg to said adjacent rod allowing pivotal rotation about and longitudinal movement along said adjacent rod;

means for removably mounting the second end to said adjacent rod;

means for anchoring the second end in a desired pivoted position about and a desired longitudinal location along said adjacent rod;

a food clamp having an L-shaped member with a first end matingly engageable within the longitudinal bore of the leg and a U-shaped member fixedly disposed adjacent to a corner of the L-shaped member with two ends of the U-shaped member orientated parallel to a second end of the L-shaped member; and means for releasably attaching the food clamp to the leg allowing rotation about and extension along the longitudinal axis of the leg.

12. The improvement of claim 11, wherein the longitudinal axis of the leg is perpendicular to said adjacent rod.

13. The improvement of claim 11, wherein the securing means comprises a perpendicular bore, in relation to the longitudinal axis of the leg, passing through the second end of the leg, matingly engageable with said adjacent rod allowing longitudinal movement along and pivotal rotation around said adjacent rod.

14. The improvement of claim 13, wherein the anchoring means comprises a bolt threadingly engaged within the second end of the leg in communication with the perpendicular bore such that tightening the bolt causes said adjacent rod to be fixedly anchored between the bolt and the perpendicular bore surface opposing the bolt holding the leg in a desired angular and longitudinal position.

15. The improvement of claim 13, wherein the removable mounting means comprises:

said adjacent rod having a notched portion with parallel, longitudinal notched faces cut into said adjacent rod;

the second end of the leg having a slot passing through the leg with a pair of opposing parallel faces in communication with the perpendicular bore allowing removal of the clamping member from said adjacent rod by moving the leg to the notched portion of said adjacent rod and passing the notched portion of said adjacent rod through the slot in the second end of the leg.

16. The improvement of claim 11, wherein the releasable attaching means comprises a bolt threadingly engaged within the first end of the leg in communication with the longitudinal bore such that tightening the bolt causes the food clamp to be fixedly attached between the bolt and the longitudinal bore surface opposing the bolt in a desired orientation of rotation and extension.

17. In a rotisserie with a cradle having a pair of longitudinally spaced opposite end plates, a plurality of longitudinally extending and circumferentially spaced rods fixedly secured to said end plates, a pair of adjacent rods being circumferentially spaced from each other a sufficient distance to define a longitudinal opening for the passage of food into the interior of said cradle, the improvement of at least one clamping member comprising:

a leg having a longitudinal axis, a first end, a second end, a longitudinal bore on the first end, a perpendicular bore on the second end matingly engageable with said adjacent rod allowing pivotal rotation about and longitudinal movement along said adjacent rod, and a slot passing through the second end of the leg in communication with the perpendicular bore of sufficient size to allow passage of a notched portion of said adjacent rod;

a first bolt threadingly engaged within the second end of the leg in communication with the perpendicular bore such that tightening the bolt causes said adjacent rod to be fixedly secured between the bolt and the opposing perpendicular bore surface holding the leg in a desired angular and longitudinal position;

a food clamp having an L-shaped member with a first end matingly engageable within the longitudinal bore in the first end of the leg and a U-shaped member fixedly disposed adjacent to a corner of the L-shaped member with two ends of the U-shaped member orientated parallel to a second end of the L-shaped member; and a second bolt threadingly engaged within the first end of the leg in communication with the longitudinal bore such that tightening the bolt causes the first end of the L-shaped member of the food clamp to be fixedly secured between the bolt and the opposing longitudinal bore surface in a desired orientation of rotation and extension.

* * * * *